(12) United States Patent
Sharony

(10) Patent No.: US 6,411,608 B2
(45) Date of Patent: Jun. 25, 2002

(54) METHOD AND APPARATUS FOR VARIABLE POWER CONTROL IN WIRELESS COMMUNICATIONS SYSTEMS

(75) Inventor: Jacob Sharony, Dix Hills, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 09/823,589

(22) Filed: Mar. 30, 2001

Related U.S. Application Data

(60) Provisional application No. 60/217,588, filed on Jul. 12, 2000, and provisional application No. 60/245,834, filed on Nov. 3, 2000.

(51) Int. Cl.$^7$ ................................................ H04Q 7/20
(52) U.S. Cl. ..................... 370/318; 370/328; 455/522; 455/69
(58) Field of Search ................................. 370/318, 328, 370/338, 342; 375/225; 455/522, 69

(56) References Cited

U.S. PATENT DOCUMENTS

| | | | |
|---|---|---|---|
| 5,278,689 A | * | 1/1994 | Gitlin et al. ................. 359/137 |
| 5,293,639 A | * | 3/1994 | Wilson et al. ................. 455/17 |
| 5,345,504 A | * | 9/1994 | West, Jr. ..................... 380/205 |
| 5,396,516 A | * | 3/1995 | Padovani et al. ............ 375/225 |
| 5,722,051 A | * | 2/1998 | Agrawal et al. .............. 455/69 |
| 5,812,938 A | * | 9/1998 | Gilhousen et al. ............ 455/69 |
| 5,889,604 A | * | 3/1999 | Hayashi ....................... 359/181 |
| 6,084,888 A | * | 7/2000 | Watanabe et al. ........... 370/473 |

* cited by examiner

Primary Examiner—Min Jung
(74) Attorney, Agent, or Firm—Fish & Neave; Jeffrey H. Ingerman; Pejman Sharifi

(57) ABSTRACT

A wireless communications system that has variable power levels in communications frames may be provided. The wireless communication system may include a plurality of cells that include transmitters for providing communications services to a geographic area. Each cell may be assigned a channel selected from a limited number of available channels. Communications frames may be transmitted in the cells using a plurality of data rates. Each communications frame may include a portion that is to be transmitted at one of the data rates. The power level used for transmitting that portion of a communications frame may be selected (e.g., lowered) to limit at what distances that portion may be properly received. Locations of cells in the geographic area may be partly determined based on the power levels.

42 Claims, 4 Drawing Sheets

METHOD AND APPARATUS FOR VARIABLE POWER CONTROL IN WIRELESS COMMUNICATIONS SYSTEMS

CROSS-REFERENCE TO RELATED APPLICATION

This application claims the benefit of U.S. Provisional Patent Application No. 60/217,588, filed Jul. 12, 2000, and the benefit of U.S. Provisional Patent Application No. 60/245,834, filed Nov. 3, 2000, which are hereby incorporated by reference herein in their entirety.

BACKGROUND OF THE INVENTION

This invention relates to wireless communications systems, and more particularly, to wireless communications systems having variable power communications frames.

Some known communications systems may comprise communications cells in which transmitters may transmit information at a data rate that is selected from a plurality of fixed data rates that are available to the system. In such systems, information may be transmitted in communications frames that include a preamble portion. The preamble portion of communications frames may always be transmitted at a specific data rate. The preamble portion may be transmitted at the lowest one of the available data rates to accommodate receivers in the system that may not be capable of operating at the higher data rates that are available. Data rates for other portions of communications frames may be transmitted at any of the fixed data rates that are available in the system. Known techniques for implementing such systems have been deficient in meeting communications services demands (e.g., high speed throughput, low inter-cell interference, etc.) without substantially adding complexity, cost, circuitry, etc.

Such known systems include some wireless local areas network communications systems. Wireless local area network communications systems ("wireless LANs") are typically used in applications that involve mobile computers, in applications where wireline installation is not feasible, etc. Such applications include warehouse inventory tracking, portable point of sale, shipping and receiving, package tracking, etc.

The IEEE 802.11 communications standard has been used by some vendors to provide interoperability between wireless LAN equipment. The 802.11 standard specifies a protocol in which information is transmitted in frames. The standard specifies features such as frame size, frame content information, data rates, roaming, etc. The primary type of information that was initially transmitted in systems that were designed to the 802.11 standard as published was information such as barcode information, point of sale information, package tracking information, etc. In such known systems, several remote terminals may be in communications with a single access point to receive and transmit information such as bar code information, point of sale information, package tracking information, etc. The standard as published specifies a communications medium that is shared by transmitters (e.g., an access point and one or more remote terminals).

SUMMARY OF THE INVENTION

In accordance with the principles of the present invention, variable power level communications for wireless communications systems may be provided. A wireless communications system, such as a wireless LAN, may be provided. Transmitters (e.g., remote terminals) and receivers (e.g., access points) in the communications system may communicate using communications frames. Communications services may be provided for a substantially contiguous geographic area with a plurality of transmitters and receivers in a plurality of cells. Communications frames may be transmitted in two substantially contiguous portions that are at two power levels. A first portion of a communications frame may be transmitted at one data rate (e.g., the lowest data rate supported by the system) and at one power level. The remaining portion of a communications frame may be transmitted at one data rate (e.g., other supported data rates) and at another power level. The power level for the remainder portion may be greater than the power level for the first portion. The first portion may be a preamble portion of a communications frame. A plurality of cells and a plurality of channels may be used. Each cell may be assigned one channel from the plurality of channels. The number of cells may be greater than the number of available channels. Positions of cells in a communications system may be determined based on the variable power levels of the communications frames, number of channels, and the data rates. A power level for a first portion that is at a lowest data rate may be selected so that the first portion may have approximately the same signal propagation characteristics as a remainder portion that is at the next lowest data rate at another power level (e.g., higher power level). Transmitters may be configured to operate using a spread spectrum communications technique, such as direct sequence spread spectrum techniques. Transmitters may listen to a channel or frequency band on which the transmitter is configured to transmit and may determine whether the channel is available for transmission.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which.

DETAILED DESCRIPTION OF THE INVENTION

Figure 1:
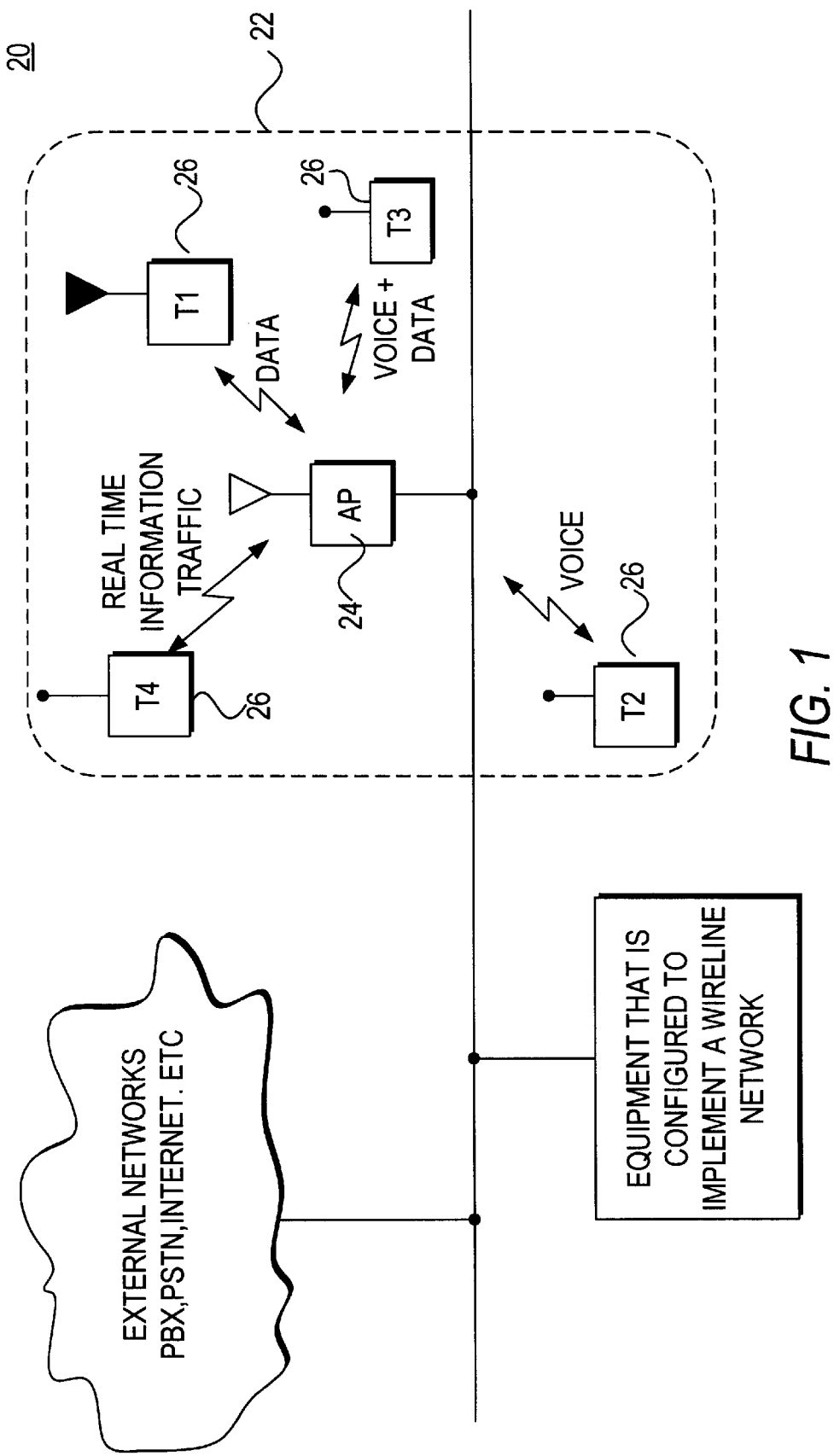
FIG. 1 is a diagram of an illustrative communications network that includes an illustrative wireless local area network in accordance with the present invention.

The present invention improves communications in wireless communications systems. In a country or particular geographic area, specific frequency bands or channels may be licensed or designated for use to different types of wireless communications systems. For example, in the United States, three bands may have been set aside for use by wireless LANs. Wireless communications systems may be implemented in groups of communications cells to provide communications services for a substantially contiguous geographic region. One criterion in determining locations of cells in the geographic region may be channel re-use. A cell may be assigned one channel for providing communications in that cell. Positions of cells in a geographic area may be determined based on interference that may be caused by the use of that channel in other cells in that area (e.g., channel re-use factor).

Interference between cells that use the same channel may be partly dependent on the data rate. An inverse type relationship may exist between the signal propagation characteristics of communications (e.g., communications frames) and the data rate used for the communications. For example, lower data rates (e.g., the lowest available data rate), rather than higher data rates of a system, may factor in to determining how far apart cells using the same channel (e.g., frequency band) may be positioned to allow those cells to operate substantially without interference from each other.

In cells that include receivers that support higher (raw) data rates of the system, actual data rates in the cells may depend on the distance between a transmitter (e.g., a terminal) and a receiver (e.g., an access point). For example, when the transmitter and receiver support data rates of 1, 2, 5.5, and 11 mbps at one transmission power level, the raw bit rate may be 11 mbps at a distance of 50 ft or less; the raw bit rate may be 5.5 mbps at a distance of 100 ft to 50 ft; the raw bit rate may be 2 mbps at a distance of 100 ft to 250 ft; and the raw bit rate may be 1 mbps at a distance of 250 ft to 400 ft. Where there are a limited number of communications bands, for example three communications bands, adjacent cells may be assigned different bands with a reuse factor of three to cover a given area with cells. The following table shows how the total number of interfering cells assigned to one of the three bands may increase as distance between the cells is increased when frames are transmitted at one power level.

| No. of interfering cells | At distance ® = Cell Radius) |
|---|---|
| 6 | 3R |
| 6 | 3√3R |
| 6 | 6R |
| 12 | 3√7R |
| 6 | 9R |

Communications frames may be transmitted in two portions at differing data rates. Different power levels may be used to transmit the two portions of a communications frame. One portion of the frame may be transmitted at one level and another portion of the frame may be transmitted at a different level. In each frame, one portion of the frame (e.g., a preamble portion) may have to be transmitted at the lowest supported data rate. The power level for the portion that is to be transmitted at the lowest supported data rate may be selected to be lower than the power level for the remaining portions of the frame. Lowering the power level for the low data rate portion of the frame allows cells to be positioned more closely together to meet desired demands on communications services (e.g., by providing actual data rates that are closer to raw data rates).

With reference to FIG. 1, wireless LAN 20 may include a plurality of cells 22. Cell 22 may include an access point 24 (which is sometimes referred to as a wireless local bridge or a base station). Cell 22 may include remote terminals 26. Access point 24 and remote terminals 26 may be the transmitters and receivers of the system. Each terminal 26 may be a mobile, portable, or stationary terminal. Each terminal 26 may be a desktop workstation, laptop computer, palm top computer, handheld personal computer, pen-based computer, personal digital assistant, handheld scanner, data collector, handheld printer, etc. Each terminal 26 may include wireless-network-interface resources that are configured to provide two-way radio or infrared signal communications. Such resources may include an interface card (or an external modem), a software driver, and an antenna. Other suitable resources may also be used, but for clarity and brevity, the wireless network interface resources will be discussed primarily in the context of an interface card, a software driver, and an antenna. The interface card may have been configured to use a standard computer-bus interface (e.g., ISA, PCMCIA, etc.) or standard computer port (e.g., RS232, RS422, etc.) to provide convenient access to terminal equipment.

A network-operating-system may be implemented on each terminal 26. In each terminal 26, the interface card may be coupled to the network-operating-system application using the software driver. The interface card for each remote terminal 26 may be a network-communications interface. The network interface card for each terminal 26 are typically implemented to use a carrier sense access protocol and to modulate communications signals with a spreading sequence.

Access point 24 may be an interface for communicating between wireless network 20 and a wireline network. Access point 24 may be configured to provide a communications gateway between terminals 26 that are in cell 22 and between a wireline network and the terminals 26. Access point 24 may include a resource(s) (e.g., software, hardware, or a combination thereof) that is configured to connect the access point to a wireline network (e.g., on ethernet network, a token ring network, etc.). Access point 24 is typically configured to convert signals between wireline and wireless communications mediums. The conversion may allow the access point to pass communication information between the wireline network and wireless remote terminals 26.

Access points are typically provided with sufficient processing, hardware, software, etc. to operate in compliance with the IEEE 802.11 (e.g., to provide 802.11 roaming, standard 802.11 data rates, etc.) and to provide additional features that are developed by a vendor. Access point 24 may be implemented using a personal computer (e.g., a Power PC, an IBM compatible computer), server, workstation, etc., having an appropriate operating system, wireless-network-interface resources, wireline-network-interface resources, network-operating-system applications, etc.

Access point 24 and remote terminals 26 may be configured to communicate using spread spectrum modulation techniques (e.g., direct sequence spread spectrum modulation, frequency hopping spread spectrum modulation, etc.).

The IEEE 802.11 standard specifies the format and content of communications frames. Communications frames that may also be sometimes referred to as messages or packets may be of variable size with the size of each frame being identified in frame header information. In some embodiments, the body of each frame may vary from 0 to 2312 octets. Communications frames may comprise digital information that is for a receiver (e.g., a terminal or access point) in the system.

In operation, initially when one of the terminals 26 is powered, that terminal 26 may seek to join cell 22 by associating with access point 24. Remote terminal 26 may become associated with access point 24 after a preliminary exchange of communications between access point 24 and terminal 26. A plurality of terminals 26 may be associated with each access point 24. Each terminal 26 may have different communications capabilities and requirements. Access point 24 may manage the communications traffic between terminals 26 and the wireline network. Access point 24 may manage the communications traffic by controlling when frames are transmitted to each remote terminal 26 in cell 22. The communications traffic in cell 22 may include data frames (e.g., signals that carry frames to provide data communications), voice frames (e.g., signals that carry frames to provide voice communications), real-time frames (e.g., signals that carry frames to provide real-time communications such as multimedia or voice communications), management frames (e.g., signals that carry frames to provide network management communications), etc.

The wireline network that is coupled to access point 24 may include equipment 23 that is configured to implement the wireline network. The wireline network may be coupled to an external network (e.g., PBX, PSTN, Internet, etc.).

Figure 2:
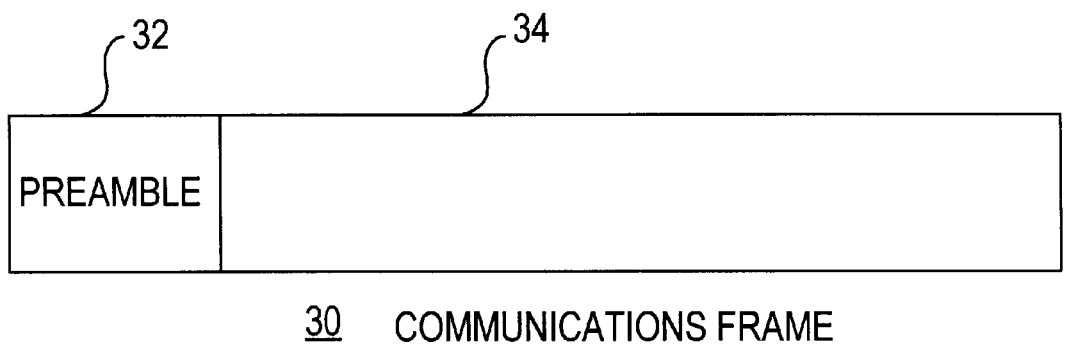
FIG. 2 is a diagram of an illustrative communications frame for use in wireless communications systems in accordance with the present invention.

With reference now to FIG. 2, communications frame 30 may show the structure of a communications frame that may be transmitted in communications systems, such as wireless LAN 20 of FIG. 1. Communications frame 30 may include preamble portion 32 that may be used for purposes such as synchronization. Remainder portion 34 of communications frame 30 may be a data portion. Together preamble portion 32 and remainder portion 34 may substantially comprise a communications frame. For synchronization or other reasons (e.g., requirements of communication standard), preamble portion 32 may have to be transmitted at a particular data rate. For example, communications in a system may be specified to be at one of four data rates with the data rate for preamble portion 32 being fixed to the lowest one of the data rates, and remainder portion 34 may be transmitted at one of the four data rates. Typically transmitters capable of operating at higher data rates may operate at these rates to obtain high data throughput.

Figure 3:
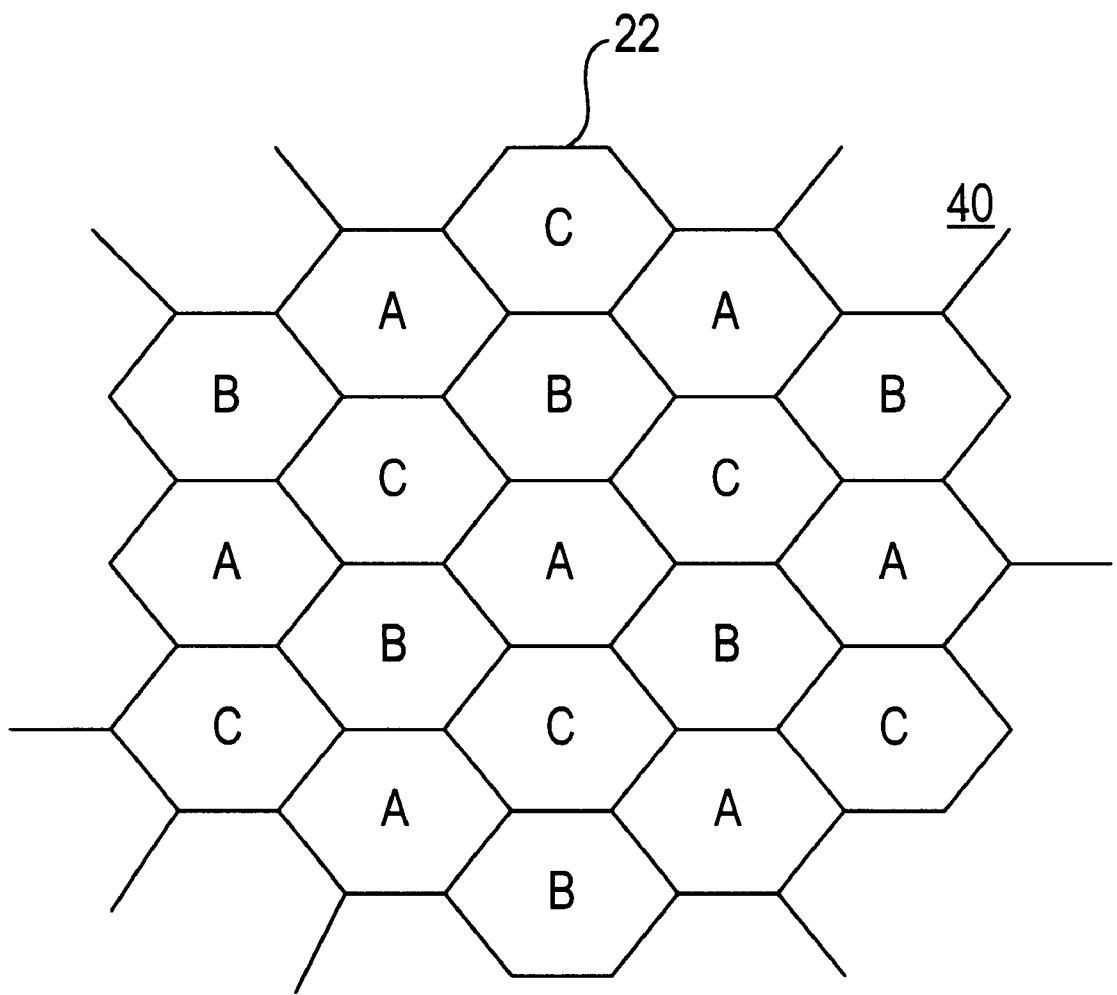
FIG. 3 is a diagram of illustrative communications cells for a geographic area in accordance with the present invention.

With reference now to FIG. 3, a plurality of cells 22, such as the cell shown in FIG. 1, may be positioned in a substantially contiguous geographic area to provide communications services to that area. For clarity and brevity, cells 22 may be discussed primarily in the context of three channels (e.g., channels A, B, and C) that are assignable to the cells for communications. The number of available channels may be less than the number of communications cells. In each cell, a transmitter, such as access point 24 or terminals 26 of FIG. 1, may operate using communications frames, such as communications frame 30 of FIG. 2. Communications frames may be transmitted with a first portion (e.g., preamble portion 32) being transmitted at one data rate (e.g., the lowest specified data rate in the system) and at one power level. The other portion (e.g., remainder portion) may be transmitted at any one of the available data rates in the system at a different power level. The power level for the other portion (e.g., remainder portion) may be the conventional or system specified power level for transmitting frames in such systems and the power level for the first portion may be at a power level that is lower than the conventional or system specified power level.

For example, in a system that uses data rates of 1, 2, 5.5 and 11 Mbps, the first portion may be transmitted at 1 Mbps and the remainder portion may be transmitted at 1, 2, 5.5 or 11 Mbps. The first potion may be transmitted at a power level that is lower than the power level for the remainder portion.

If desired, transmitters and receivers in cells 22 may use direct sequence spread spectrum communications techniques. If desired, transmitters in cells 22 may use a communication technique in which transmitters listen (e.g., monitor) to a particular channel to determine whether that channel is available for transmission (e.g., the channel is clear for transmission of a frame by the transmitter). For clarity and brevity, cells 22 in FIG. 3 have been illustrated in equal size hexagons. In application, shapes and size of cells may be irregular.

Figure 4:
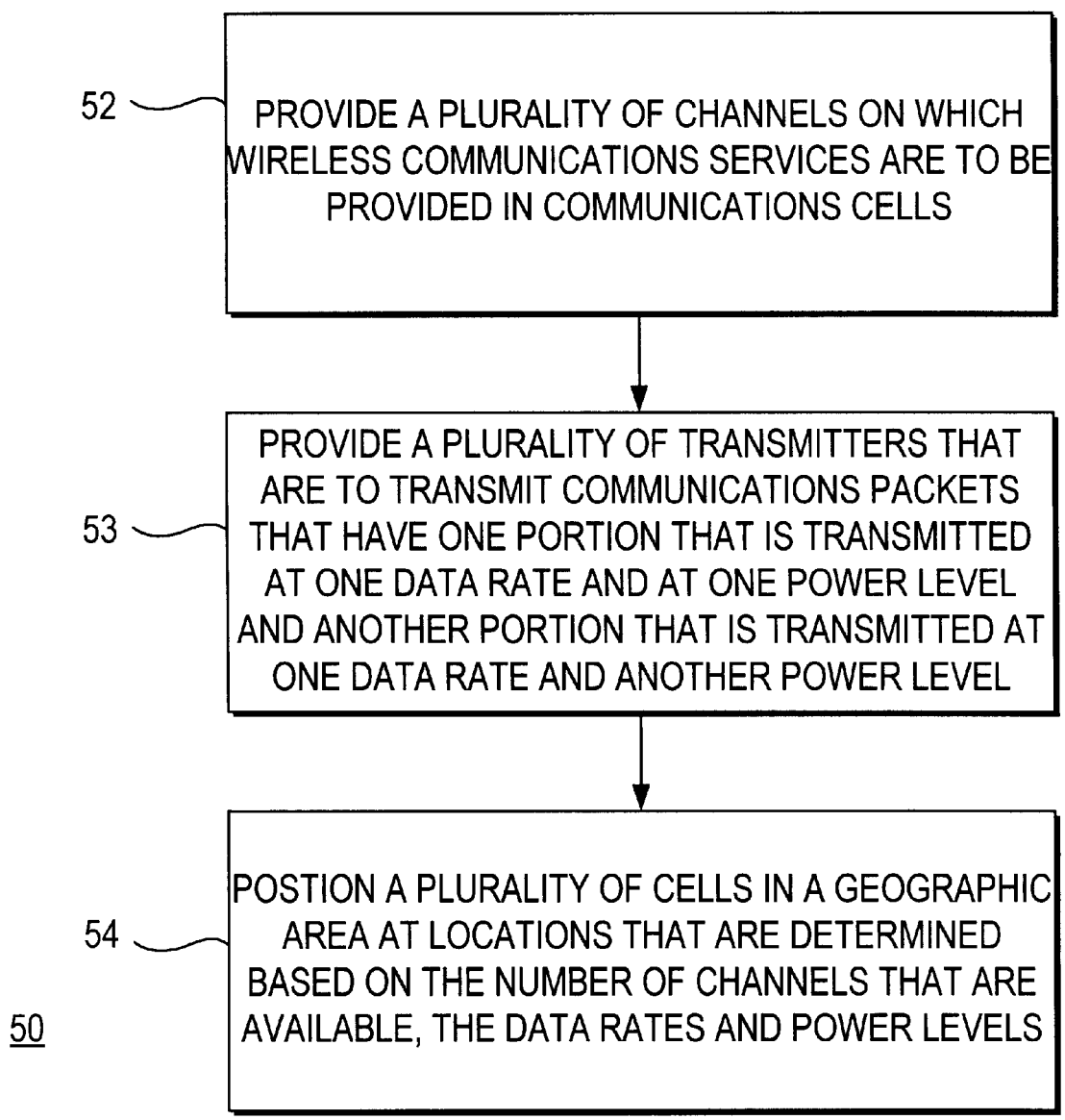
FIG. 4 is a flow chart of illustrative steps involved in providing communications services having variable power communications frames.

With reference now to FIG. 4, illustrative steps involved in providing high throughput communications for communications systems having a plurality of data rates are shown in FIG. 4. At step 52, a plurality of channels may be provided for a communications system. At step 53, transmitters may be provided that are configured to transmit communications frames by transmitting one portion of the communications frame at one data rate and at one power level and transmit another portion of the communications frame at one data rate (e.g., another data rate) and another power level. Communications services may be provided using the channels in a group of communications cells. At step 54, locations of the cells in the geographic area may be determined based on the number of assignable channels, the data rates, and the power levels. Transmitting some portions of frames that are at a lowest one of the available data rates (e.g., the preamble portion) at a lower power level than the remainder portions of frames may allow cells to be spaced more closely together. Closer spacing may provide higher total data rates.

By reducing power to a portion of the frames (e.g., preamble portion), interference from nearby cells using the same channel may be reduced and therefore, the sharing of data bandwidth between a number of nearby cells using that same channel may be limited which may result in an effective user throughput that may be up to the throughput that may be achieved in a single cell infrastructure.

If desired, a preamble portion for each frame may be transmitted at 1 mbps (the lowest data rate) regardless of the communications data rate of the remainder portion. If operating without variable power control, transmitters (e.g., access points) using the same channel (in different cells) may be within "hearing" distance of each other at 400 ft or less and may refrain from transmitting at the same time based on a clear channel assessment function by listening to the channel to determine whether that channel is available (i.e., all the cells within 400 ft of each other are sharing the same band). By transmitting the 1 Mbps preamble portion, at a lower power level than other portions of the communications frame, the "hearing" distance of transmitters using the same channel may be reduced. Reducing the "hearing" distance may then allow locations of cells to be determined based on the reduced "hearing" distance. If desired, the power level for the preamble portion at 1 Mbps may be selected to have the preamble portion have a "hearing" distance that is approximately the same as the "hearing" distance for the next lowest data rate (e.g., 2 Mbps). The determination of "hearing" distances, which may be determined by one of ordinary skill in the art based on the plurality of factors discussed above, may be used to position communication cells at locations in a geographic area at which the cells may operate substantially without interference from other cells on the same channel.

Thus, cells in a wireless communications system may have actual data rates that are closer to raw data rates that are supported by a system by selectively reducing power when transmitting portions of frames that are at lower data rates.

If desired, tuning threshold of receivers in the cells may be adjusted. For example, the threshold for the receivers may be raised (e.g., from 20 db to 50 db). With higher receiving thresholds, receivers may receive transmissions that have the strongest signals and reject other transmissions. Receiving the strongest transmissions may reduce the sharing of bandwidth between a group of nearby cells that are using the same channel. If desired, receiver thresholds may be adjusted in combination with variable power control of frames.

The foregoing is merely illustrative of the principles of this invention and various modifications can be made by those skilled in the art without departing from the scope and spirit of the invention.

What is claimed is:

1. A method for use in wireless communications systems, comprising:

providing a communications frame for transmission in the wireless communications system; and transmitting a first portion of the communications frame at a first data rate and at a first power level and a second portion of the communications frame at a second data rate that is different from the first data rate and at a second power level that is different from the first power level.

2. The method of claim 1 wherein said transmitting comprises transmitting the communications frame at a transmitter that is part of a wireless local area network communications system.

3. The method of claim 1 wherein said providing comprises providing in the communications frame a set of digital information that is directed to a receiver in the wireless communications system.

4. The method of claim 1 wherein said transmitting comprising transmitting the communications frame over air for a receiver in the wireless communication system.

5. The method of claim 1 wherein said providing comprising providing the communications frame in a format that is for transmission in a wireless local area network communications system.

6. The method of claim 1 further comprising:

listening to a particular frequency band to determine whether the frequency band is available for transmission; and said transmitting comprising transmitting the communications frame on that particular frequency band.

7. The method of claim 1 wherein said transmitting comprising providing the first data rate for the first portion to be lower than the second data rate for the second portion.

8. The method of claim 7 wherein said transmitting comprises providing the first power level of the first portion to be lower than the second power level for the second portion.

9. The method of claim 1 wherein said transmitting comprising providing the first data rate for the first portion to be substantially lower than the second data rate for the second portion.

10. The method of claim 9 wherein said transmitting comprises providing the first power level of the first portion to be lower than the second power level for the second portion.

11. The method of claim 1 wherein said transmitting comprising transmitting the communications frame using direct sequence spread spectrum communications techniques.

12. The method of claim 1 wherein said transmitting comprises providing the first portion to be a preamble portion of the communications frame.

13. The method of claim 1 wherein said transmitting comprises providing the second portion to be a data portion of the communications.

14. The method of claim 1 wherein said transmitting comprising providing the first and the second portions to substantially comprise the communications frame.

15. The method of claim 1 further comprising providing plural ones of said communications frame that are each for transmission in a different one of a plurality of communications cells that are in the wireless communications system.

16. The method of claim 15 further comprising repeating said transmitting for different communications frames in each cell.

17. The method of claim 16 further comprising providing a plurality of frequency bands with one of the frequency bands being assigned to each of the communications cells for carrying transmissions.

18. The method of claim 17 wherein said providing a plurality of frequency bands comprises providing more communications cells than frequency bands.

19. The method of claim 17 further comprising:

providing wireless communications services to a substantially contiguous geographic area using the plurality of cells;

positioning the communications cells that have been assigned the same frequency band at locations in the geographic area at which the cells operate substantially without interference from the other cells.

20. The method of claim 19 wherein said transmitting comprises:

providing the first data rate for the first portion to be lower than the second data rate for the second portion; and providing the first power level of the first portion to be lower than the second power level for the second portion.

21. The method of claim 20 further comprising listening in each of the communications cells to the frequency band assigned to that cell to determine whether that frequency band is available for transmission by the transmitter that is operating in that cell.

22. A transmitter for use in wireless communications systems, comprising:

a transmitter configured to provide a communications frame for transmission in the wireless communications system, and configured to transmit a first portion of the communications frame at a first data rate and at a first power level and a second portion of the communications frame at a second data rate that is different from the first data rate and at a second power level that is different from the first power level.

23. The transmitter of claim 22 wherein said transmitter is configured to operate in a wireless local area network communications system.

24. The transmitter of claim 22 wherein said transmitter is configured to include in the communications frame a set of digital information that is directed to a receiver in the wireless communications system.

25. The transmitter of claim 22 wherein said transmitter is configured to transmit the communications frame over air for a receiver in the wireless communication system.

26. The transmitter of claim 22 wherein said transmitter is configured to provide the communications frame in a format that is for transmission in a wireless local area network communications system.

27. The transmitter of claim 22 wherein said transmitter is configured to listen to a particular frequency band to determine whether the frequency band is available for transmission, and to transmit the communications frame on that particular frequency band.

28. The transmitter of claim 22 wherein said transmitter is configured to have the first data rate for the first portion be lower than the second data rate for the second portion.

29. The transmitter of claim 28 wherein said transmitter is configured to have the first power level of the first portion be lower than the second power level for the second portion.

30. The transmitter of claim 22 wherein said transmitter is configured to have the first data rate for the first portion be substantially lower than the second data rate for the second portion.

31. The transmitter of claim 30 wherein said transmitter is configured to have the first power level of the first portion be lower than the second power level for the second portion.

32. The transmitter of claim 22 wherein said transmitter is configured to transmit the communications frame using direct sequence spread spectrum communications techniques.

33. The transmitter of claim 22 wherein said transmitter is configured to have the first portion be a preamble portion of the communications frame.

34. The transmitter of claim 22 wherein said transmitter is configured to have the second portion be a data portion of the communications.

35. The transmitter of claim 22 wherein said transmitter to have the first and the second portions substantially comprise the communications frame.

36. A wireless communications system comprising:
   a plurality of communications cells; and
   a plurality of the transmitters of claim 22 that are each to operate in one of the communications cells.

37. The system of claim 36 wherein each transmitter is configured to transmit communications frames having the first portion at the first data rate and the first power level and the second portion at the second data rate and second power level.

38. The system of claim 37 wherein a plurality of frequency bands are assigned to the cells with the transmitters in each cell being configured to communicate on the frequency bands assigned to the cell in which the transmitter is operating.

39. The system of claim 38 wherein the number of communications cells is more than the number of frequency bands.

40. The system of claim 38 wherein the system is configured to provide wireless communications services to a substantially contiguous geographic area using the plurality of cells with the communications cells that have been assigned the same frequency band being positioned at locations in the geographic area at which the cells operate substantially without interference from the other cells.

41. The system of claim 40 wherein said transmitters are configured to have the first data rate for the first portion be lower than the second data rate for the second portion and have the first power level of the first portion be lower than the second power level for the second portion.

42. The system of claim 41 wherein said transmitters are configured to listen to the frequency band assigned to the cell to determine whether that frequency band is available for transmission.

* * * * *